(12) United States Patent
Budiman et al.

(10) Patent No.: US 10,500,737 B2
(45) Date of Patent: Dec. 10, 2019

(54) PICK-AND-PLACE DEVICE HAVING FORCE MEASUREMENT CAPABILITY

(71) Applicant: AKRIBIS SYSTEMS PTE LTD, Singapore (SG)

(72) Inventors: Sastra Budiman, Singapore (SG); Yong Peng Leow, Singapore (SG)

(73) Assignee: AKRIBIS SYSTEMS PTE LTD, Singapore (SG)

( * ) Notice: Subject to any disclaimer, the term of this patent is extended or adjusted under 35 U.S.C. 154(b) by 0 days.

(21) Appl. No.: 16/301,510

(22) PCT Filed: Jun. 28, 2016

(86) PCT No.: PCT/SG2016/050301
§ 371 (c)(1),
(2) Date: Nov. 14, 2018

(87) PCT Pub. No.: WO2018/004452
PCT Pub. Date: Jan. 4, 2018

(65) Prior Publication Data
US 2019/0176345 A1   Jun. 13, 2019

(51) Int. Cl.
*B25J 15/06* (2006.01)
*B25J 13/08* (2006.01)
*B65G 47/91* (2006.01)

(52) U.S. Cl.
CPC ......... *B25J 15/0616* (2013.01); *B25J 13/085* (2013.01); *B65G 47/91* (2013.01)

(58) Field of Classification Search
CPC .... B25J 15/0616; B25J 13/082; B25J 13/085; B65G 47/91; B65G 47/917; B66C 1/0256; H01L 21/6838; Y10S 901/40

USPC ............... 294/183, 185; 414/752.1
See application file for complete search history.

(56) References Cited

U.S. PATENT DOCUMENTS

| | | | | | |
|---|---|---|---|---|---|
| 5,961,169 | A  * | 10/1999 | Kalenian | ................. | B24B 37/30 269/21 |
| 6,328,362 | B1 * | 12/2001 | Isogai | ................ | H05K 13/0409 294/185 |
| 6,817,639 | B2 * | 11/2004 | Schmalz | ............... | B25B 11/005 294/185 |
| 7,426,781 | B2 * | 9/2008 | Burger | ............... | H05K 13/0409 29/740 |
| 8,991,464 | B2 * | 3/2015 | Konno | ............. | H01L 21/67011 156/758 |

(Continued)

*Primary Examiner* — Dean J Kramer
(74) *Attorney, Agent, or Firm* — WPAT, PC

(57) ABSTRACT

A pick-and-place device for picking a work-piece from a first location to a second location and having force measurement is disclosed. The pick-and-place device comprises: (a) a positive pressure chamber formed among a pick-and-place holder, a force measuring membrane and a cover, wherein a positive pressure is supplied to the positive pressure chamber via a pressure supply inlet provided on the pick-and-place holder, and thus the force measuring membrane is being preloaded; (b) a vacuum chamber formed among the pick-and-place holder, the force measuring membrane and a pick-up membrane, wherein a negative pressure is provided via a vacuum supply inlet provided on the pick-and-place holder, wherein the pick-and-place device provides a pressure difference between the work-piece and the pick-and-place device, enabling a pick-and-place capability.

8 Claims, 4 Drawing Sheets

(56) References Cited

U.S. PATENT DOCUMENTS

2002/0121789 A1* 9/2002 Duebel .............. H05K 13/0815
   294/185
2014/0353995 A1* 12/2014 Nishiyama ......... H05K 13/0413
   294/185
2017/0321799 A1* 11/2017 Defranceski ......... B25J 15/0616

* cited by examiner

PICK-AND-PLACE DEVICE HAVING FORCE MEASUREMENT CAPABILITY

TECHNICAL FIELD

The present invention relates to a pick-and-place device. More specifically the present invention relates to a pick-and-place device which has the capability to provide the pick-and-place process with force measurement in a single unit.

BACKGROUND OF THE INVENTION

Pick-and-place devices are of importance in automated product handling lines. This is because when combined with sensors such as weighing cells, photocells, cameras and the like, articles on a conveyor belt can for example be identified according to size, colour, shape etc. and picked-up and placed for example on an another conveyor, or into pre-formed packaging. Also, in the electronic manufacturing process, electronics components are being transferred from one station to another station for further processing. The pick-and-place operation generally requires vacuum to pick-up a work-piece and unloads it by either purging air or releasing vacuum pressure.

Generally, such pick-and-place apparatus produce rapid transfer operations, during pick-and-place operation, the force exerted on the components are unknown and damage to the components could happen if calibration is not done properly. It is the objective of the present invention to provide a force measuring capability by a feedback control system to set the force within desired range in order to prevent damage on the components or to apply a regulated force during pick-up and placement operation.

During the pick-and-place transfer operation, some applications desire to detect the presence of the work-piece rather than measuring the contact force. The present invention could also make use of the force measuring capability to detect the presence of the work-piece.

US Patent Publication No. 20150147141 discloses a pick-and-place head for transporting a plurality of work-pieces from at least one first location to at least one second location, the pick-and-place head comprising: a plurality of nozzles with each nozzle configured to engage one of the plurality of work-pieces; at least one independent vacuum supply configured to attach to one nozzle of the plurality of nozzles; and, at least one shared vacuum supply configured to attach to at least two nozzles of the plurality of nozzles not attached to the at least one independent vacuum supply. The pick-and-place head further comprising a vacuum sensors configured to indicate whether or not a sufficient force is being applied to the plurality of work-pieces. The pick-and-place head does not provide a force measuring capability that can be used by a feedback control system.

SUMMARY OF THE INVENTION

It is therefore an object of the present invention to provide a pick-and-place device for picking a work-piece from a first location to a second location and having force measurement capability, the pick-and-place device comprising:

(a) a positive pressure chamber formed among a pick-and-place holder 10, a force measuring membrane 20 and a cover 60, wherein a positive pressure is supplied to the positive pressure chamber 65 via a pressure supply inlet 80 provided on the pick and place holder 10, and thus the force measuring membrane 20 is being preloaded;

(b) a vacuum chamber formed among the pick-and-place holder 10, the force measuring membrane 20 and a pick-up membrane 40, wherein a negative pressure is provided via a vacuum supply inlet 70 provided on the pick-and-place holder 10, wherein the pick-and-place device provides a pressure difference between the work-piece and the pick-and-place device, enabling a pick-and-place capability.

Another object of the present invention is to provide a method for picking and placing a work-piece from a first location to a second location using a pick-and-place device having a force measurement capability, the method comprising the steps of:

a) positioning the pick-and-place device above a work-piece at a first location;
b) approaching the work-piece with the pick-and place device and observing feedback signal of the strain gauge;
c) detecting a desired feedback signal to turn-on a vacuum to pick up the work-piece;
d) positioning the pick-and-place device above a second location;
e) approaching a placing location and observing a feedback signal of the strain gauge;
f) detecting a desired feedback signal to turn-off the vacuum supply to place the work-piece thereto; and
g) returning back the pick-and-place device to the first location for the next cycle.

Yet still another object of the present invention is to provide a method of simulating a pressure contact onto a work-piece using a pick-and-place device, comprising the steps of:

a) positioning the pick-and-place device above the work-piece;
b) approaching the work-piece while observing a feedback signal indicated by the strain meter;
c) detecting a desired feedback signal from the strain meter, stop approaching the work-piece further;
d) waiting for a specified time set by the user and move away from the work-piece, re-start the steps from step b);

A further object of pick-up membrane 40 of the present invention is to provide a pick-and-place capability and protect work-piece from impact force. Wherein the pick-up membrane 40 is a low stiffness membrane is used to reduce impact force during a rapid pick-and-place process.

When pick-up membrane 40 is in contact with the work-piece, a reactive force will be created arising from the reaction on the pick-up membrane 40. The force will be transmitted through force transmission spacer 42 to the force measuring membrane 20. The amount of force will be proportional to the strain of the force measuring membrane 20. The strain could be observed by the strain gauge 72. After calibration, the value of strain will be known to be corresponding to a certain amount of force.

When the pick-and-place device 100 is attached on a stage 10 and strain gauge signal being connected to a general industrial-use strain meter, a controller can control the force within a specific range with feedback from the strain gauge signal being produced by a strain meter. When the controller realises that more force is needed to be applied to the work-piece, the controller will command the stage 10 to move closer to the work-piece. The force measuring membrane 20 thus deforms more to provide more force and this phenomenon creates more strain on force measuring membrane. This strain could be realized by the strain gauge and strain meter.

These and other objects, advantages and features of the present invention will be better appreciated by those having ordinary skill in the art in view of the following detailed description of the invention in view of the drawings.

The capability of force measuring and feedback control system could also be used with others mechanisms to mimic the human finger contact force for instances.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION

Figure 1A:
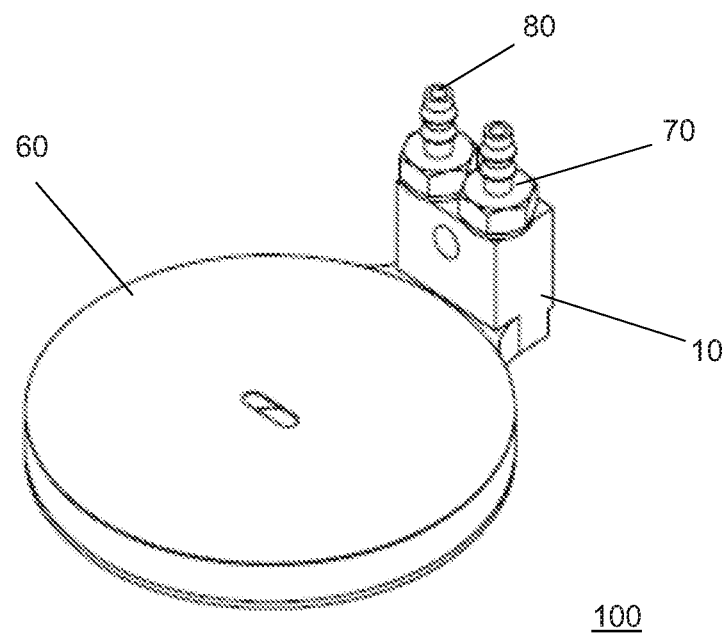
FIG. 1A is a perspective view of a pick-and-place device with force measurement in accordance with the present invention.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspect. Also, it is to be understood that the invention is not limited in its application to the details of construction and the arrangement of the components set forth in the following description or illustrated in the drawings. The invention is applicable to other embodiments or of being practiced or carried out in various ways and is intended to include various modifications and equivalent arrangements within the spirit and scope of the appended claims.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1B:
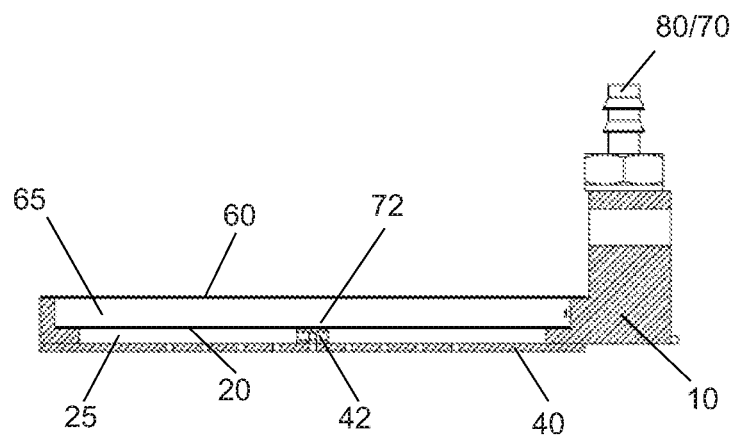
FIG. 1B is a sectional view of the pick-and-place device with force measurement in accordance with the present invention.

As shown in the FIG. 1, there is shown a perspective view of a pick-and-place device 100 having a force measurement capability in accordance with the present invention. The pick-and-place device 100 of the present invention comprises a pick-and-place holder 10, a cover 60 mounted on the top of the pick and place holder 10, a force measuring membrane 20 positioned beneath the cover 60, forming into a positive pressure chamber 65 (as shown in FIG. 1B), and a pick-up membrane 40 located beneath the force measuring membrane 20. At one end of the pick-and-place holder 10, there is provided a pressure supply inlet 80 and a vacuum inlet 70, and a positive pressure is supplied to the positive pressure chamber 65 through a general pressure pump (not shown).

The positive pressure that is generated by the pressure pump in the positive pressure chamber 65 preloads the force measuring membrane 20 and therefore, an elastic deflection range of the force measuring membrane 20 is increased.

FIG. 1B is a section view of the pick-and-place device 100 as shown in FIG. 1A. A force transmission spacer 42 is positioned between the pick-up membrane 40 and the force measuring membrane 20 for the transmission of vacuum from the vacuum chamber 25 to the pick-up membrane 40. On the pick-and-place holder 10, there is shown the sectional view of the pressure supply inlet 80 and the vacuum inlet 70.

Figure 2:
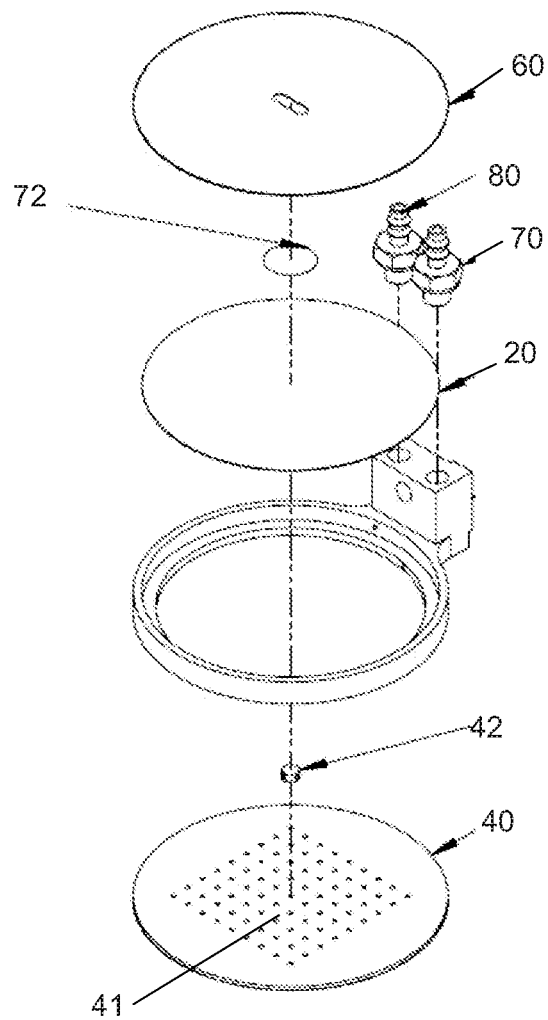
FIG. 2 is an exploded perspective view showing a pick-and-place device with force measurement in accordance with the present invention.

In the preferred embodiment, the pick-and-place holder 10, the force measuring membrane 20 and the pick-up membrane 40 form into a vacuum chamber 25 as shown in FIG. 1B. The vacuum inlet 70 is connected to a vacuum supply pump (not shown) which supplies a vacuum to the vacuum chamber 25. The vacuum chamber 25 of the pick-and-place device 100 provides a pressure difference between a workpiece and the pick-and-place device 100 via a plurality of holes 41 (as shown in FIG. 2) on formed the pick-up membrane 40. The vacuum of the vacuum chamber 25 is used to lift up a work-piece 90 (as shown in FIG. 3) for placement onto another location in accordance with the present invention.

FIG. 2 is an exploded perspective view of the pick-and-place device in accordance with the present invention. As shown, the pick-and-place device 100 comprises a pick-and-place holder 10 which in this preferred embodiment is a ring like structure, a pick-up membrane 40 as the base of the device 100, a force measuring membrane 20 above the pick-up membrane 40, and a cover 60 positioned above the force measuring membrane 20. A pressure inlet 80 and a vacuum inlet 70 are provided on the pick-and-place holder 10 to provide a positive pressure to the pressure chamber 65 and the vacuum chamber 25. A force transmission spacer 42 is positioned in between the pick-up membrane 40 and the force measuring membrane 20 for the transmission of vacuum from the vacuum chamber 25 to the pick-up membrane 40. A strain gauge 72 is positioned on the surface of the force measuring membrane 20, which is used to give a signal or reading with respect to a force that has been applied. In the preferred embodiment, a wire is connecting the strain gauge 72 to a strain meter (not shown) and the strain meter converts the mechanical strain into electrical signal for controller so that a specific force is then provided to the pick-and-place device 100.

A plurality of holes on the pick-up membrane 40 allows the picking up of a workpiece 90 by the pick-up membrane 40 by having a vacuum suction from the vacuum chamber 25.

Figure 3:
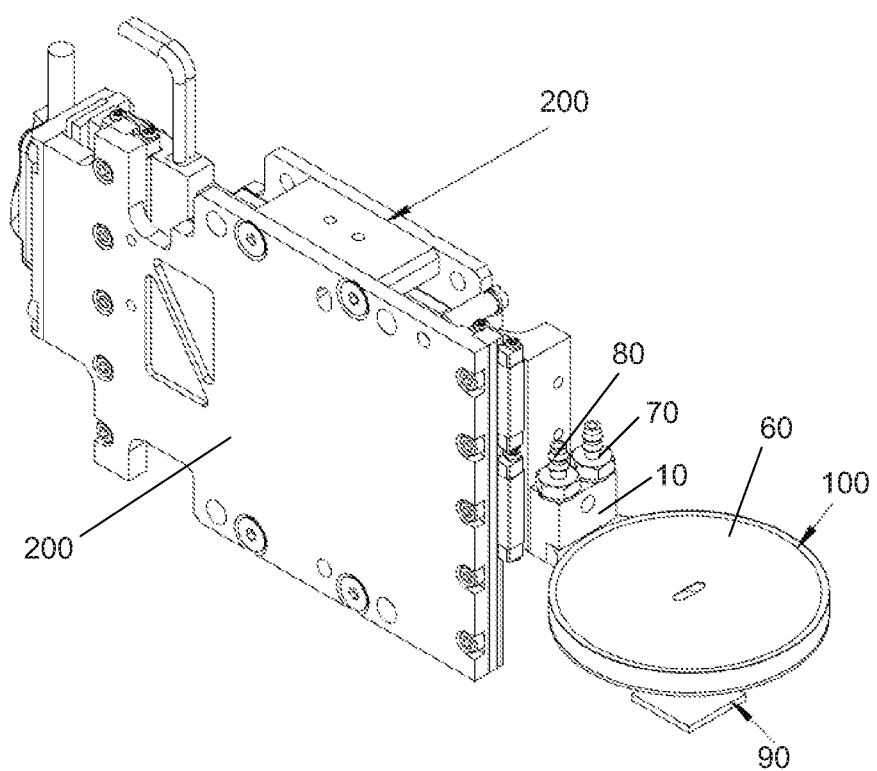
FIG. 3 is a schematic perspective view of the pick-and-place device with force measurement capability being mounted to a pick-and-place assembly for transfer a workpiece from a first location to a second location.

FIG. 3 is a perspective view showing the pick-and-place device 100 mounted onto a pick-and-place assembly to provide a picking and placing of a work-piece from one location to another location.

In the course of picking up a work-piece 90 and placing the work-piece, the work-piece touches an environment, for instance, a lead frame base. The reaction force due to the contact between the pick-up membrane 40 and the work-piece 90 is transmitted via the force transmission spacer 42.

The reaction force between the pick-up membrane 40 and the work-piece 90 is proportion to the strain of the force measuring membrane 20. The strain in the force measuring membrane 20 is due to the reaction force formed in between the pick-up membrane 40 and the workpiece 90 will be measured by the strain gauge 72. The strain value of the strain gauge 72 will then be read by a strain meter (not shown) and then convert the strain value into a corresponding force value after calibration.

The pick-and-place device 100 is moveable in relation to a work-piece 90 to be transferred from one location to another location, and the pick-up membrane 40 which has a low stiffness, is used to reduce impact force during a rapid pick-and-place process by the pick-and-place device 100. The strain gauge 72 is mounted, in the present preferred embodiment, to the force measuring membrane 20 in the pick-and-place device 100.

In accordance with the preferred embodiment of the present invention, the pick-and-place device 100 uses a low stiffness pick-up membrane 40 to reduce the impact force during a rapid pick-and-place process. The pick-and-place device 100 integrated with force measurement capability into one unit, and therefore the overall mass of the device is reduced. The reduction of overall weight of the device enables a faster pick-and-place operation carried out by the pick-and-place assembly 200, as shown in FIG. 3.

In the preferred embodiment, a strain gauge 72 is used in the pick-and-place device 100 as a force measuring device which further reduces the overall weight of the device. The positive pressure of the device 100 provides a larger working range to the force measuring membrane 20 and changes the shape of the pick-up membrane 40 to provide a better contact between the workpiece 40 and the pick-and-place device 100.

Figure 4:
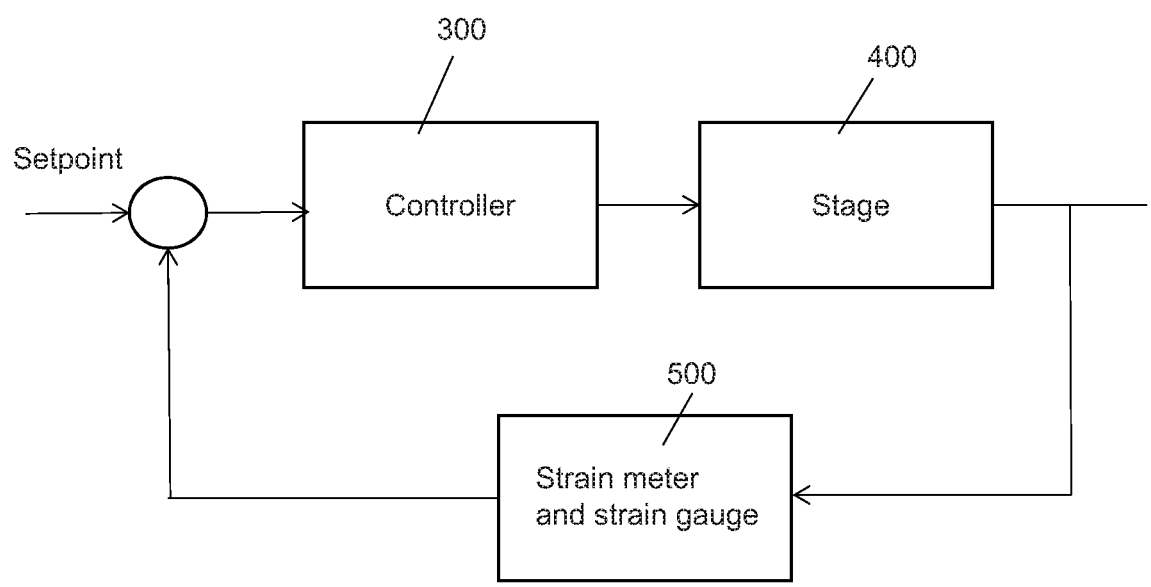
FIG. 4 is a flowchart indication signal control of the pick-and-place device in accordance with the present invention.

FIG. 4 is a flowchart indication signal control of the pick-and-place device in accordance with the present invention. At the initial stage, a setpoint is first set, which is a desired force that the pick-and-place device 100 is to be exerted. A controller 300 controls the force exerted by the pick-and-place device 100 to proceed with the pick-and-place process 400. A strain meter or strain gauge 500 is used to indicate the force that is exerted by the device 100. The force that exerted by the pick-and-place device 100 can be readjusted at the setpoint if it is required.

The present invention also relates to a method for picking and placing a work-piece from a first location to a second location using a pick-and-place device and having force measurement capability, the method comprising the steps of:

a) positioning the pick-and-place device 100 above a work-piece 90 at the first location;
b) approaching the work-piece with the pick-and-place device and observing feedback signal of the strain gauge;
c) detecting a desired feedback signal to turn-on a vacuum to pick up the work-piece;
d) positioning the pick-and-place device above a second location;
e) approaching a placing location and observing a feedback signal of the strain gauge;
f) detecting a desired feedback signal to turn-off the vacuum supply to place the work-piece thereto; and
g) returning back the pick-and-place device to the first location for the next cycle.

The present invention also relates to a method of simulating a pressure contact onto a work-piece 90 using a pick-and-place device 100 to pick and transfer the work-piece 90 from one location to another location, comprising the steps of:

a) positioning the pick-and-place device above the work-piece at the first location;
b) approaching the work-piece to pick up the work-piece while observing a feedback signal indicated by the strain gauge coupled to a controller;
c) detecting a desired feedback signal from the strain gauge, stop further approaching to the work-piece;
d) waiting for a specified time set by user to re start the approaching step in step b) that is set by the user;
e) controlling the pick-and-place device to move away from the work-piece; and
f) moving the pick-and-place device to a second location of the work-piece to start another pick and place next cycle.

In the method of simulating a pressure contact onto a work-piece 90, the pick-and-place device 100 is being controlled to exert an appropriate force by a controller (not shown). Similarly, in the method for picking and placing a work-piece 90 from a first location to a second location using a pick-and-place device 100, the device 100 is being controlled to exert an appropriate force by a controller.

Though modifications and changes to the invention should be readily apparent to those having ordinary skill in the art, which modifications are intended to be within the spirit and scope of the invention as claimed, it is understood that the foregoing description is illustrative of the present invention and should not be considered as limiting. Therefore, other embodiments of the present invention are possible without departing from the spirit and scope of the present invention as claimed.

What is claimed is:

1. A pick-and-place device for picking a work-piece from a first location to a second location and having force measurement capability, the pick-and-place device comprising:
    (a) a positive pressure chamber formed among a pick-and-place holder, a force measuring membrane and a cover, wherein a positive pressure is supplied to the positive pressure chamber via a pressure supply inlet provided on the pick-and-place holder, and thus the force measuring membrane is being preloaded;
    (b) a vacuum chamber formed among the pick-and-place holder, the force measuring membrane and a pick-up membrane, wherein a negative pressure is provided via a vacuum supply inlet provided on the pick-and-place holder, wherein the pick-and-place device provides a pressure difference between the work-piece and the pick-and-place device, enabling a pick-and-place capability.

2. The pick-and-place device for picking a work-piece from a first location to a second location as set forth in claim 1, further comprising a force transmission spacer which is located in between the force measuring membrane and the pick-up membrane.

3. The pick-and-place device as set forth in claim 2, wherein the force transmission spacer is used to transmit the force that is received from the pick-up membrane to the force measuring membrane.

4. The pick-and-place device as set forth in claim 3, wherein the force transmission spacer is used to transmit the force that is received from the pick-up membrane to the force measuring membrane.

5. The pick-and-place device as set forth in claim 2, wherein the pick-and-place device is moveable relative to the work-piece to be transferred from a first location to a second location.

6. The pick-and-place device as set forth in claim 2, wherein the pick-up membrane is used to reduce impact force during a rapid pick-and-place process.

7. The pick-and-place device as set forth in claim 1, wherein vacuum is supplied in between the force measuring membrane and the pick-up membrane.

8. The pick-and-place device as set forth in claim 1, further comprising a strain gauge mounted onto the top surface of the force measuring membrane is used to measure the strain of the force measuring membrane in the course of a pick-and-place process.

* * * * *